March 6, 1962  H. J. OSTERMAN  3,023,848
LUBRICATION DEVICE FOR CONVEYOR CHAINS
Filed May 1, 1959  2 Sheets-Sheet 1
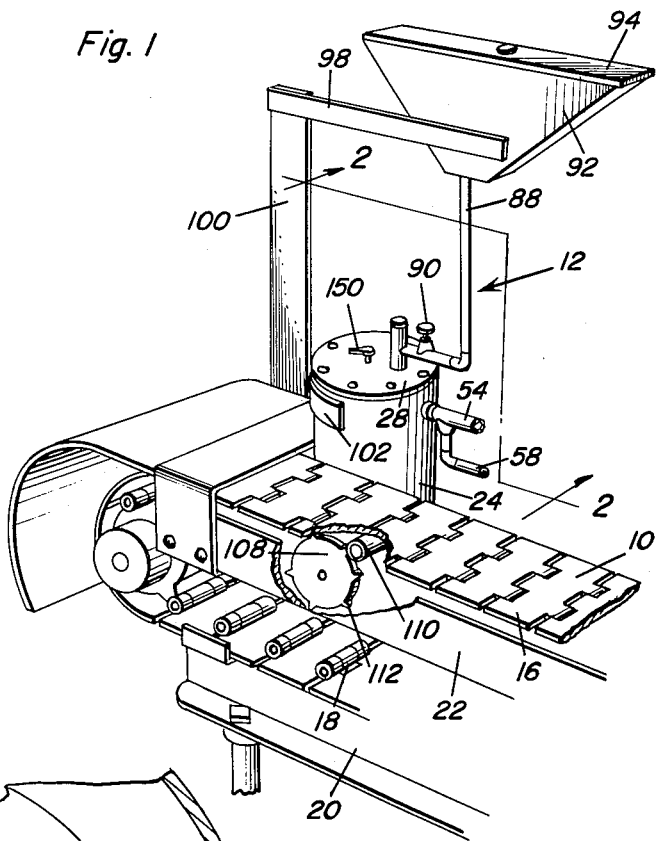
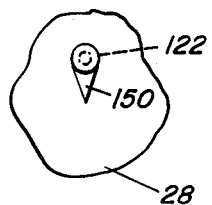
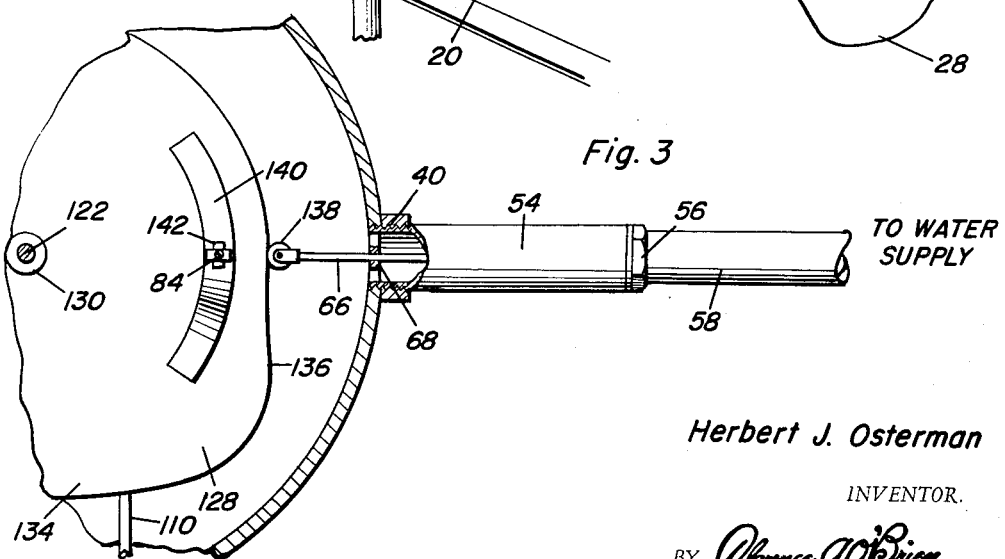
Herbert J. Osterman
INVENTOR.
BY *Clarence A. O'Brien*
and *Harvey B. Jacobson*
Attorneys March 6, 1962

H. J. OSTERMAN 3,023,848

LUBRICATION DEVICE FOR CONVEYOR CHAINS

Filed May 1, 1959

Herbert J. Osterman
INVENTOR.

BY Clarence A. O'Brien
and Harvey B. Jacobson
Attorneys

United States Patent Office 3,023,848
Patented Mar. 6, 1962

3,023,848
LUBRICATION DEVICE FOR CONVEYOR CHAINS
Herbert J. Osterman, 1620 NE. 25th,
Oklahoma City, Okla.
Filed May 1, 1959, Ser. No. 810,313
12 Claims. (Cl. 184—15)

This invention relates to lubricators and more particularly to a lubrication assembly for a conveyor.

Currently, certain types of conveyors are manually lubricated. In particular, conveyors used in the dairy industry, beverage plants, breweries, food processing plants and distilleries employ chain type conveyors which must be periodically lubricated to have them operate satisfactorily.

In some instances bars of soap are used for this purpose and the soap is applied in a most rudimentary manner, that is by hand.

An object of this invention is to provide a lubricator for automatically applying charges of lubricant on the conveyor in coordination with the actuation of the conveyor.

Briefly, the invention is embodied in a lubricator with means operatively connected with the conveyor chain for automatically applying charges of substances into a mixing chamber and for conducting the mixed charges of this substance onto the conveyor chain. Typically, one substance is water and the other substance is liquid soap or a soap-like substance such as a detergent. It is to be clearly understood that substances other than water and soap may be used with equal facility, particularly in special applications. For the dairy industry and other industries which employ chain conveyors, soap mixed with water in an approximate proportion of one-part by volume of soap to thirty parts of water is considered to be approximately ideal.

The lubricator has a tank within which a liquid soap inlet communicates and a water inlet communicates. Both of these inlets are controlled by normally closed valves. However, the valves are opened in timed relationship with each other and in timed sequence with the operation of the conveyor through a mechanical drive line. The drive line preferably includes a gear which is rotated by the hinges connecting the links of the conveyor chains so that no additional parts such as lugs, are required to be secured to the endless conveyor chain. In other words, absolutely no alteration to the existing chain is required. Instead, an ordinary gear having a small number of teeth in proportion to its circumference, is located at a place where it will be actuated as the hinges move in their ordinary path of travel. As the gear rotates, shafting connected with the gear causes the cam to be correspondingly rotated. The cam is so disposed with reference to the normally closed valves, that the valves are required to periodically open and automatically close as the shafting is actuated. In this way definite quantities of soap and water are admitted to the mixing chamber and automatically, for instance by gravity, passed on to the endless conveyor for the lubrication thereof.

Although there have been lubricators developed in the past, it is considered that a lubricator in accordance with this invention demonstrates a considerable advance in the coordination between the admission of charges of liquid into the mixing chamber with the actuation of the conveyor. Therefore, the soap may be maintained in a comparatively small container and water under line pressure admixed therewith as it is required for lubricating purposes. There is no requirement for pre-mixed soap and water which would necessitate a rather large receptacle for the storage thereof. Instead, the comparatively small container of soap is all that is necessary in an installation constructed in accordance with the invention. The necessary high volume (in comparison to the volume of soap) of water is simply drawn from a line as required.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a part of a typical endless conveyor together with a lubricator operatively associated therewith, parts of the endless conveyor being broken away to illustrate otherwise hidden detail of the lubricator.

FIGURE 3 is a cross-sectional view taken approximately on the line 3—3 of FIGURE 2.

FIGURE 5 is a fragmentary elevational view showing an indicator to provide information as to the positions of the valves at all times during the operation of the lubricator.

Figure 2:
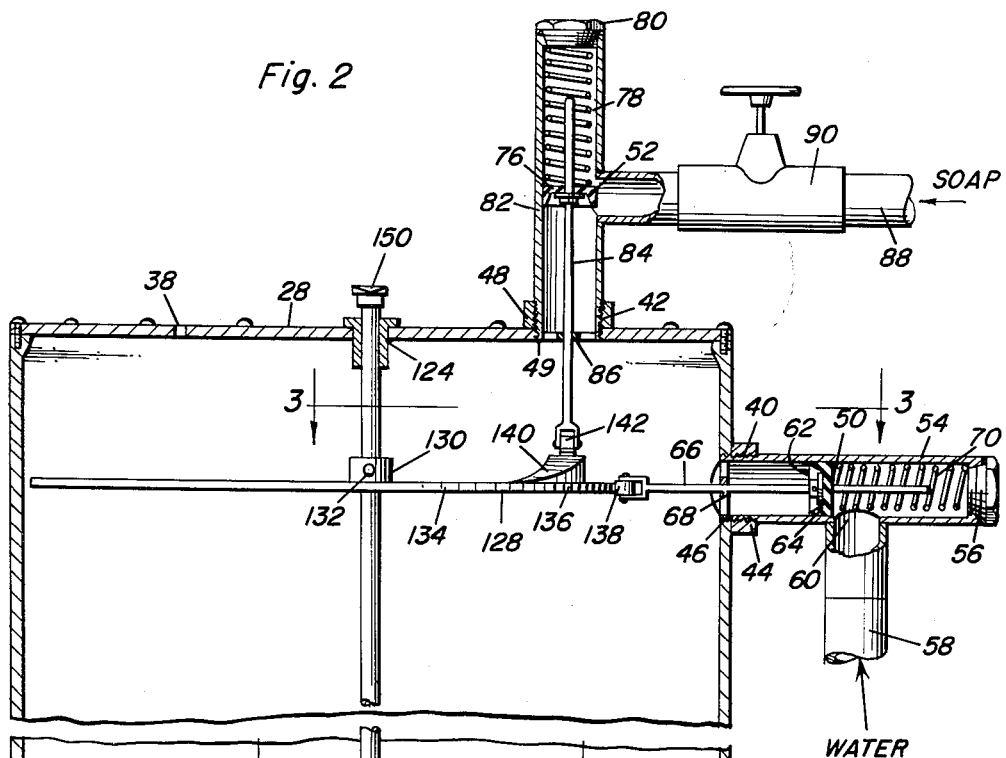
FIGURE 2 is a sectional view taken on the line 2—2 of FIGURE 1 and on an enlarged scale.
Figure 4:
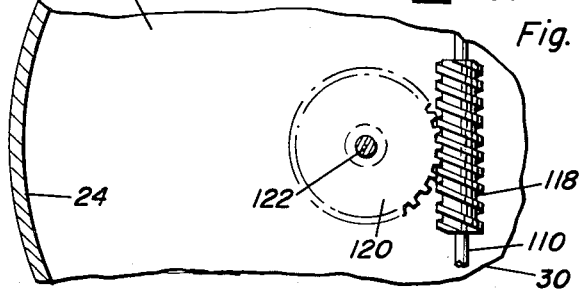
FIGURE 4 is an enlarged sectional view taken on the line 4—4 of FIGURE 2.

In the accompanying drawings there is an endless conveyor 10 which is absolutely conventional in construction, this endless conveyor diagrammatically representing a number of manufacturers makes, styles and designs of endless conveyors with which lubricator 12 may be used. The endless conveyor in the drawings is constructed of a plurality of links 16 connected together by hinges 18 to form an endless chain conveyor. Support 20, also of standard construction, includes a framework 22 by which to support the upper and lower flights and ends of the endless conveyor.

Lubricator 12 is shown at the end of endless conveyor 10, although it is to be clearly understood that the lubricator may be placed anywhere along the conveyor which is considered to be convenient. Some types of conveyor installations will find it more convenient to have the lubricator at a location other than the end of the conveyor. The lubricator is constructed of tank 24 which encloses a mixing chamber 26. The tank shown has a flat top 28, a partial spherical bottom 30 and a cylindrical side wall 32, although this, of course, may be varied. Outlet 34 is constructed of a short nipple welded or otherwise fastened in the bottom of the tank and is arranged either directly over a portion of one flight of the conveyor 10 or provided with a tubing and/or spray head to position the discharge from mixing chamber 26 over the conveyor lower flight or upper flight. Chamber 26 is preferably emptied by gravity and therefore there is a vent 38 in the top wall 28 of the chamber, the vent being used if it is found necessary, otherwise it may be omitted.

There is a first inlet 40 and a second inlet port 42 connected with tank 10. Inlet 40 is made of a nipple 44 connected in an opening 46 in the side wall of tank 24. Inlet 42 is similarly constructed, including nipple 48 in registry with an opening 49 in the top of tank 24. First normally closed valve 50 is operatively connected with inlet 40 and second normally closed valve 52 is operatively connected with the second inlet 42. Valve 50 is constructed of a tube 54 threaded or otherwise secured in nipple 44 and having an open end closed by plug 56. A water line 58 is connected at right angles to the tube 54 and is in registry with the interior thereof by communicating with aperture 60 in the side wall of tube 54. Accordingly, water under pressure is applied in tube 54 at all times. Core 62 of valve 50 is made of a piston 64, preferably of an elastomeric substance, together with a valve operator in the form of a piston rod 66 which is attached to the piston 64. The piston rod extends through a guide 68 extending across opening 46 and enters the chamber 46. Resilient means, for example spring 70, seats upon plug 56 and the rear face of the valve element or piston 64 normally holding the valve in the closed position by retention of the piston 64 on the downstream side of opening 60. However, the spring 70 may be compressed to the extent that the piston 64 passes a sufficient area of opening 60 so that water under line pressure may flow on the downstream side of the piston 64 and enter chamber 26 through opening 46.

Valve 52 is constructed identical to valve 50 and includes piston 76, spring 78 reacting thereon and on plug 80 which closes the outer end of sleeve 82. The piston rod 84 is connected to piston 76 and extends through guide 86 which is placed across opening 49. The lower end of the piston rod 84 enters chamber 26. Liquid conductor 88 is adapted to connect with a source of liquid soap or an equivalent substance, and it has a conventional shut-off valve 90 interposed therein. Accordingly, upon actuation of valve 52 liquid soap is permitted to enter chamber 26.

A typical soap supply consists of a container 92 having a top closure 94 which may be removed for filling the container. The lower end of the container has conductor 88 connected therewith so that the liquid soap flows to valve 52 by gravity. The container 92 is preferably supported by a brace 98 attached to an upright 100, and the upright may be suitably supported, for instance, by being attached to the floor or to the framework 22 of the endless conveyor. Bracket 102 (FIGURE 1) is secured to the support 100 and to the tank 24 for the mutual support of the tank, support 100 and container 92.

There are means operatively connected with valve operators, for example the piston rods 66 and 84, for actuating the valves in synchronism with the movement of the endless conveyor 10. These means are mechanical in nature and preferably consist of a structure which requires no alternation to the conventional endless conveyor chain. Gear 108 is attached to one end of shaft 110, and the gear is located above the upper surface of the lower flight of the conveyor. The gear teeth 112 are spaced in such a way that a successive tooth is struck by successive hinges 18 in the ordinary operation of the endless conveyor. Therefore shaft 110 is turned at a rate proportional to the speed of the conveyor. This shaft extends through a pair of spaced bearings 114 in the side wall 32 of tank 24. Worm gear 118 is secured to shaft 110 intermediate the ends thereof and is located within chamber 26. The worm gear 118 is in engagement with a worm wheel 120, and this is secured to a vertical shaft 122 in chamber 26. The upper and lower ends of the vertical shaft 122 are supported in bearings 124 and 126 which are carried by the top and bottom walls of the tank 24. Consequently, the shaft 122 is rotated at a speed proportional to the speed of operation of the endless conveyor 10.

Cam 128 is attached to shaft 122, for instance by collar 130 integral with the cam, together with a setscrew 132 in the collar and bearing against shaft 122. Cam 128 is a multiple cam consisting of a flat plate 134 whose edge 136 is contacted by cam follower 138. Accordingly, the multiple cam has one section constructed by the edge of flat plate 134. The other section of the multiple cam is made of a cam track 140 on one surface of cam 128. The cam track 140 is contacted by cam follower 142 on the lower end of the valve operator 84. Both cam followers 138 and 142 are preferably, but not necessarily, made of rollers carried by forks at the adjacent ends of the two valve operators 66 and 84. It is now evident that as shaft 122 rotates, cam 128 turns and the two valves controlling the admission of water and soap respectively, are intermittently opened and spring returned to a normal position. Upon opening the valves discrete charges of water and soap are applied in the chamber 26 in which they are mixed simply by flowing thereinto under pressure. As they are mixed the two liquids flow through outlet 34 as a mixture and the mixture flows over a portion of the endless conveyor during the operation of the conveyor thereby intermittently lubricating the conveyor in accordance with its speed of operation.

In order that the endless conveyor lubricator 12 does not stop in such position that either of the valves are in the open position, the end of shaft 122 is extended through the tank, and there is an indicator, for example pointer 150, operative in coordination with graduations to show that the valves are in the closed position. When in the closed position, it is safe to stop the endless conveyor or otherwise stop operation of the lubricator or as a further alternative, simply close valve 90 and a valve (not shown) in the water line 58.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a conveyor, a lubricator, said lubricator comprising a tank defining a mixing chamber which has an outlet, a first liquid inlet and a second inlet for lubricant, a first valve and a second valve associated with said inlets respectively, each valve having a valve operator, and mechanical means driven by the conveyor for periodically actuating said valve operators in timed relation with the conveyor to admit charges into said tank from said inlets.

2. In combination with a conveyor, a lubricator, said lubricator comprising a tank defining a mixing chamber which has an outlet, a first liquid inlet and a second inlet for lubricant, a first valve and a second valve associated with said inlets respectively, each valve having a valve operator, a cam engaging said operators, and means drivingly connected with the conveyor for actuation thereby to drive said cam and consequently operate said valves to admit charges of liquid and lubricant from said valves into said chamber.

3. The subject matter of claim 2 wherein said conveyor includes a plurality of links connected by hinges disposed between adjacent links, and said cam actuating means include a gear and shaft assembly driven by the hinges of the conveyor.

4. The lubricator of claim 1 wherein said valves are each normally closed and are opened by said mechanical means.

5. In combination with a conveyor having a plurality of links and means connecting the links, different sources of substance under pressure, a lubricator, said lubricator comprising a tank and defining a chamber having an outlet, a first inlet, a second inlet, normally closed valves in said inlets, said inlets adapted to connect to said different sources of substance under pressure whereby upon opening said valves said substances enter the chamber, and means connected with said link connecting means of said conveyor for actuating said valves in timed relationship with the speed of operation of the conveyor for opening said valves to admit the substances controlled by the valves into said chamber.

6. In combination with a conveyor having a plurality of links and means connecting the links, a lubricator, said lubricator comprising a tank and defining a chamber, a first inlet, a second inlet, normally closed valves in said inlets, said inlets adapted to connect to different sources of substance under pressure whereby upon opening said valves said substances enter the chamber, means connected with said means which connect the links of said conveyor together for actuating said valves in timed relationship with the speed of operation of the conveyor for opening said valves to admit the substances controlled by the valves into said chamber, said chamber having an outlet, and means connected with the outlet for conducting the mixed substances from said chamber onto a portion of the conveyor during operation of the conveyor.

7. In combination with a conveyor having a plurality of links and means connecting the links, a lubricator, said lubricator comprising a tank and defining a chamber, having an outlet, a first inlet, a second inlet, normally closed valves in said inlets, said inlets adapted to connect to different sources of substance under pressure whereby upon opening said valves said substances enter the chamber, means connected with said means which connect the links of said conveyor together for actuating said valves in timed relationship with the speed of operation of the conveyor for opening said valves to admit the substances controlled by the valves into said chamber, said valve actuating means including a multiple cam, means for rotating said multiple cam, and said valves each having a valve operator in engagement with sections of said multiple cam so that as said cam rotates said valve operators are correspondingly actuated.

8. The combination of claim 7 wherein each of said valves is provided with a spring and a valve element engaged by said spring, and said spring yieldingly retaining said valve elements in the valve closed position.

9. In combination, a lubricator for a conveyor, valves adapted to connect with sources of substances and control the flow of said substances, mechanical means operatively driven by the conveyor at a speed proportional to the actuation of the conveyor for opening said valves periodically to pass substances from said valves, and means connected with the outlets of said valves for accumulating for mixing and then conducting the substances issued from the valves onto a portion of the conveyor during the operation of said conveyor.

10. The lubricator defined in claim 3 wherein there is an indicator connected with and driven by said shaft assembly to indicate the positions of said valves.

11. The lubricator of claim 7 wherein said multiple cam includes a member with the cam surface along one edge thereof, said member being flat and having a face on which a second cam surface is disposed.

12. The subject matter of claim 11 wherein said valve operators are at angles to each other and are in contact with said surfaces which constitute said sections of said multiple cam.

References Cited in the file of this patent
UNITED STATES PATENTS

| | | |
|---|---|---|
| 982,498 | Hoffmann | Jan. 24, 1911 |
| 1,095,003 | Leonard | Apr. 28, 1914 |
| 2,558,370 | Miller | June 26, 1951 |